(12) United States Patent (10) Patent No.: US 8,266,352 B2
Kleinfeld (45) Date of Patent: Sep. 11, 2012

(54) KEY-OPERATED MEMORY-PROGRAMMABLE CONTROL COUPLED TO A PERSONAL COMPUTER

(75) Inventor: Jens Kleinfeld, Chemnitz (DE)

(73) Assignee: Robert Bosch GmbH, Stuttgart (DE)

( * ) Notice: Subject to any disclaimer, the term of this patent is extended or adjusted under 35 U.S.C. 154(b) by 912 days.

(21) Appl. No.: 10/583,645

(22) PCT Filed: Oct. 12, 2004

(86) PCT No.: PCT/EP2004/011385
§ 371 (c)(1),
(2), (4) Date: May 7, 2007

(87) PCT Pub. No.: WO2005/064425
PCT Pub. Date: Jul. 14, 2005

(65) Prior Publication Data
US 2007/0233913 A1 Oct. 4, 2007

(30) Foreign Application Priority Data
Dec. 20, 2003 (DE) .................. 103 60 228

(51) Int. Cl.
*G06F 13/38* (2006.01)
(52) U.S. Cl. ........................... 710/67; 710/62
(58) Field of Classification Search ............ 710/67
See application file for complete search history.

(56) References Cited

U.S. PATENT DOCUMENTS

| 5,333,277 A * | 7/1994 | Searls ........................... 710/300 |
| 5,437,044 A * | 7/1995 | Hohner et al. ................... 710/72 |
| 5,649,132 A | 7/1997 | Fumarolo et al. |
| 2003/0197680 A1* | 10/2003 | Davenport .................... 345/163 |

FOREIGN PATENT DOCUMENTS

| DE | 34 40 917 | 5/1986 |
| DE | 3440917 A1 * | 5/1986 |
| DE | 40 12 790 | 10/1991 |
| DE | 42 36 247 | 4/1994 |
| DE | 195 15 198 | 10/1996 |
| DE | 196 08 498 | 10/1996 |
| WO | 97/03390 | 1/1997 |
| WO | 99/49371 | 9/1999 |

OTHER PUBLICATIONS

Siemens AG, Automation & Drives, Simatic HMI: "Simatic PC—Panel . . . "Order No. 6AV7691-0AB00-0AB0, Jul. 21, 2001, pp. 1-1-4-6, A1-B2. (In English).

* cited by examiner

*Primary Examiner* — Henry Tsai
*Assistant Examiner* — John Roche
(74) *Attorney, Agent, or Firm* — Michael J. Striker

(57) ABSTRACT

The keys which are used to activate the machine functions are embodied as keys (T1 Tn) which are directly connected to one of the SPS inputs (9). One of the several key planes can be selected by the user interface (13) of the PC coupled to the SPS. A control unit (4), which is connected to the SPS inputs (9) and which processes data in the SPS, is provided. Said control unit contains information about the keyboard layout of the keys (T1 Tn) on the respectively selected key plane by the PC by means of the data interface (8) and comprises a key signal which is arranged on the SPS entry (9).

9 Claims, 2 Drawing Sheets

KEY-OPERATED MEMORY-PROGRAMMABLE CONTROL COUPLED TO A PERSONAL COMPUTER

BACKGROUND OF THE INVENTION

The invention relates to a memory-programmable control (SPS) for coupling to a data interface of a personal computer (PC), having means for operating the inputs and outputs of the SPS, the means including keys for tripping machine functions.

A memory-programmable control of this kind is already known from International Patent Application WO 97/03390.

In automation technology, manifold tasks in the industrial and private field are administered by using memory-programmable controls (SPS). The most important function elements of the known SPSs are a program memory and an SPS user logic (controller) with inputs and outputs. The SPS user logic includes a microprocessor as well as a data memory with memory regions, in particular for times, counters, flags, and process images. In the typical course of work, the SPS user logic, at the beginning of each cycle, calls up the signal states at the inputs of the SPS and sets a memory location (SPS flag), assigned to each input, to zero or one. In a subsequent program execution, the microprocessor accesses the process image of the inputs that is stored in memory and as a function of it processes the control instructions that are in the program memory. Via the outputs of the SPS, finally, signals are sent to the systems and machines that are to be controlled.

Besides the purely automatic mode of the SPS, however, again and again there is a need, for instance in manual operation, to trip certain machine functions using external user control means. Conventionally, the manual tripping of machine functions is done via a pushbutton matrix that is located on a machine control board of the SPS.

In this conventional SPS without a PC coupled to it, which is not an SPS of the generic type in question here, each pushbutton of the pushbutton matrix is connected to its own input of the SPS. Via the SPS user logic, these inputs are linked with outputs to the machine to be operated. In this way, actuating the pushbutton trips a machine function, such as the moving of a shaft. Safety requirements can readily be met, since the machine function is only active as long as the pushbutton is actuated. The signal loss of a "stop signal" for ending the machine function is precluded from the very outset in this connection, since the SPS flag corresponds directly to the voltage signal at the input. A disadvantage of this described conventional tripping by external pushbuttons connected directly to an associated SPS input, each pushbutton being allocated a single fixed meaning, is that both one pushbutton and one SPS input are needed for each machine function. As a result, the hardware is expensive, and the system is complicated to operate.

From the aforementioned WO 97/03390, it is known for an SPS to be coupled in a generic way to a conventional PC via a data interface, in order to be able to program and operate the SPS from the customary user surface of the PC, such as its keyboard and screen. As a result, machine functions can be tripped without additional external pushbuttons, but indirectly, with the interposition of the PC, via the keys of a conventional PC keyboard.

In conventional user surfaces such as PC keyboards, it is furthermore widely known, for instance by using a keyboard controller, to set up three different key levels, or in other words to make keys available on the PC keyboard whose meaning changes with the particular key level selected. From there, based on the known coupling of an SPS to a PC, the possibility arises of allocating a changing meaning for machine functions to at least some of the keys of the PC keyboard, and thus in terms of manual operation of a relatively large number of machine functions by an SPS to achieve economy in terms of hardware and make user operation simpler. In fact, however, with such provisions major safety concerns are involved, since when a PC key is pressed, what is forwarded to the SPS via the data interface is not a direct voltage signal but rather only data that represent the image of the key status, and this leads to the occupation of a memory unit in the SPS, or in other words the setting of an SPS flag, corresponding to the key status represented. The SPS user logic links this SPS flag without outputs to the machine. Any disruption within the communications path from the PC to the SPS would therefore undo what is only a data connection between the key and the machine function. In the event of a disruption, the most recent key status in the SPS would stay active. In the "key ON" state, the change of state to "key OFF" could not be transmitted to the SPS; that is, a machine that has been set in motion for instance would continue to move onward in an unwanted way.

SUMMARY OF THE INVENTION

It is the object of the invention, while preserving sufficient security against signal losses, to make an SPS available that has keys of changing meaning for tripping machine functions.

According to the invention, this object is attained by a memory-programmable control (SPS) as defined herein. Advantageous refinements of the invention also are disclosed.

The memory-programmable control of the invention is distinguished specifically first in that the keys are embodied as pushbuttons provided in addition to the conventional user surface of the PC and are each electrically connected directly to one of the SPS inputs. Moreover, from the conventional user surface of the PC, one of a plurality of key levels can be selected, each with fixed meanings, stored in memory in the PC, for the pushbuttons. In order to functionally combine the separate elements of "pb signal" and "meaning" that are constituted by these provisions, a data-processing control unit connected to the SPS inputs is provided in the SPS; from the PC via the data interface, it receives the information about the key allocation of the pushbuttons in the particular key level selected and links this information with a pushbutton signal applied to an SPS input.

The SPS of the invention with the PC coupled to it and with additional pushbuttons connected directly to the SPS inputs in this way makes it possible to economize on hardware by providing only a relatively small number of additional pushbuttons, which but they can be given meanings that can change. However, according to the invention, keys with a changing meaning are created in which at the same time, by the provision of a direct connection between the pushbuttons and the associated SPS inputs, signal losses on tripping machine functions are guaranteed to be precluded.

Especially preferred embodiments are those in which the pushbuttons are each connected, parallel to the SPS inputs, to an internal bus of the PC, so that by means of one pushbutton each, surface functions of the PC that are stored in memory in the PC and are simultaneously assigned to machine functions and to the key allocation can be tripped. The parallelism in tripping machine functions and surface functions thus extends not only to the possibility of simultaneous tripping but also to the same kind of tripping by way of a key type.

These embodiments can advantageously be implemented by providing that in the PC, a data-processing first control unit, connected to the pushbuttons via the internal bus, is provided, which links the information about the surface functions assigned to the pushbuttons and links it with a pushbutton signal, applied to the internal bus, to make a starting signal for the surface functions assigned to that pushbutton.

In a further advantageous embodiment, in the PC, a data-processing second control unit is provided, which is connected to a screen of the PC and which receives the information about a key label corresponding to the key allocation, so that the key allocation of the particular key level selected can be displayed on the screen of the PC by means of a key label.

It is advantageous if the second PC control unit receives status information about the pushbuttons from the SPS control unit via the data interface; and that the visual display of the key label of the individual pushbuttons can be designed to be dependent on the status information about the individual pushbuttons.

In a variant, the pushbuttons are located in the vicinity of the screen of the PC in such a way that the user of the device can establish a direct relationship with the key label and/or with pushbutton status information on the screen.

In all the variants with key labeling by way of the screen, it is advantageous if the software in the PC is embodied such that the key label can be displayed in reserved areas of the screen that cannot become covered by other display functions. Moreover, all the variants with key labeling can be implemented without requiring the aforementioned embodiments that involve parallel tripping of machine functions and surface functions.

Other embodiments are distinguished in that in the PC, a central memory unit is provided, in which for each selectable key level one data matrix is stored, in which matrix each of the pushbuttons is assigned a data line containing information that is allocated in columns to different purposes. The data matrix offers advantages in terms of the internal organization of intrinsically conventional operating means of the PC, which here however are used in collaboration with the SPS and the pushbuttons that have changing meanings.

BRIEF DESCRIPTION OF THE DRAWINGS

One exemplary embodiment of the invention will be described in further detail below in conjunction with the drawings.

DESCRIPTION OF THE PREFERRED EMBODIMENTS

Figure 1:
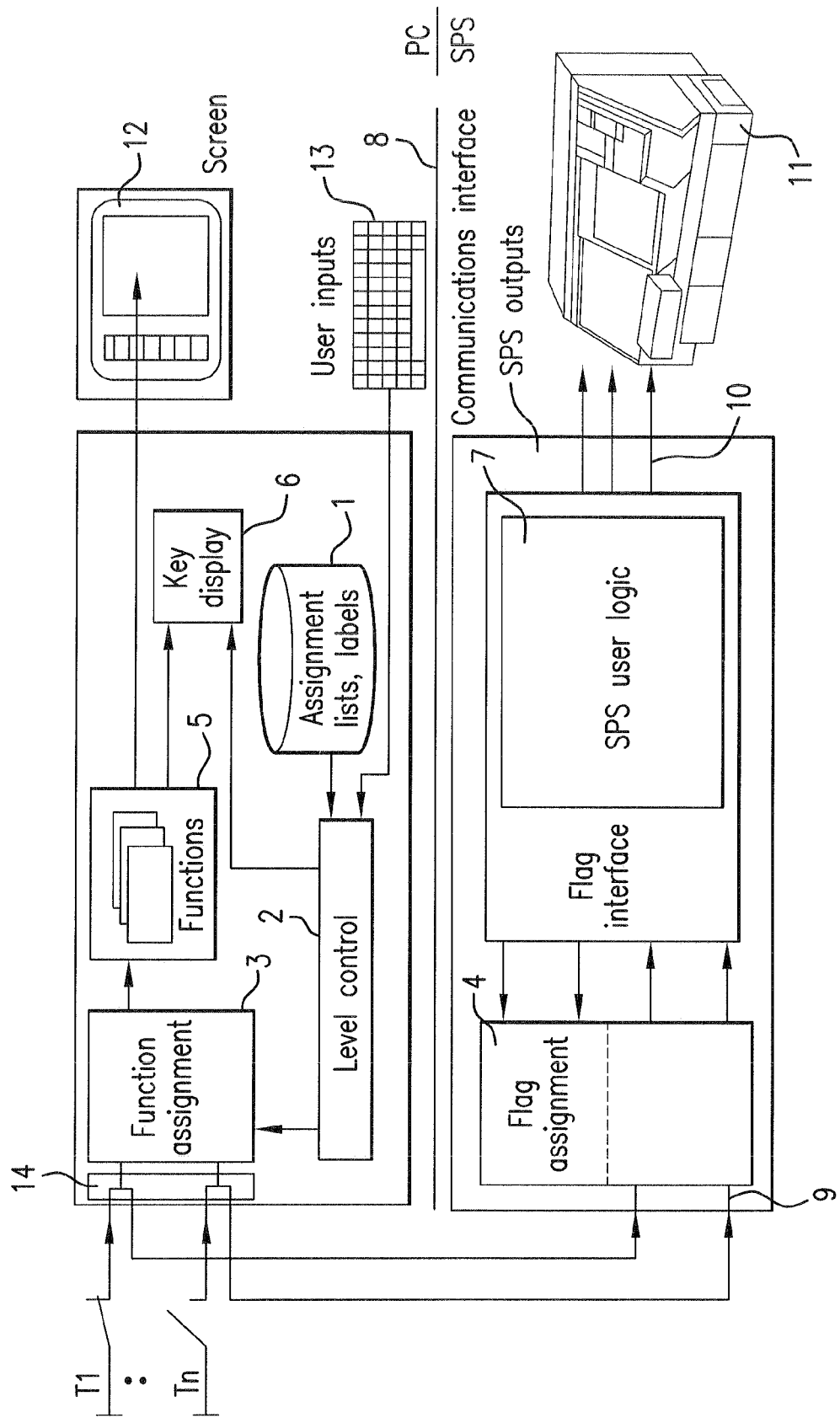
FIG. 1, a block circuit diagram for illustrating the cooperation of the components of the SPS and of the coupled PC in one embodiment of the invention.

FIG. 1 shows a block circuit diagram; the basic hardware arrangement according to the invention will first be described below.

In the lower block shown in FIG. 1, components are shown, in particular a control unit for flag assignment 4 and an SPS user logic 7, of the controller of an SPS; the flag assignment 4 is connected to the PC shown in the upper block via a data and communications interface 8. Also shown are keys, embodied as pushbuttons T1 through Tn, which are connected primarily directly to the inputs 9 of the SPS. The outputs 10 of the SPS, as indicated, are connected to a machine 11 that is to be controlled by the SPS. The PC with its screen 12 and a conventional keyboard 13 serves as a man-machine interface and implements user control and display functions (such as editors and position displays), hereinafter called surface functions 5. The user logic 7 of the SPS communicates with the control unit for flag assignment 4 and links inputs 9 to the outputs 10 and thus trips functions of the machine 11, such as a function that enables the advancement of a drive mechanism.

It is essential that the control unit for flag assignment 4, which processes the additional data, be implemented in the SPS. This flag assignment 4 is connected on the one hand directly to the SPS inputs 9 and thus to the external pushbuttons T1 through Tn, and on the other hand, via the data interface 8, it has access to information about the fixed meaning, stored in memory in the PC, of the pushbuttons T1 through Tn. The SPS user logic 7 accesses the SPS inputs 9 only indirectly, via the flag assignment 4, and the flag assignment 4 contributes the key level-dependent meaning of a key signal, present in the form of a voltage signal to an SPS input 9, which meaning is variable via the PC. If the user has selected a key level, for instance via the keyboard 13, then the key allocation, or in other words the meaning of the individual keys in the key level selected, is forwarded from the PC to the flag assignment 4 via the data interface 8. Thus in the SPS user logic 7, an SPS flag for a certain machine function is set (and then processed further there) whenever the information (for all n pushbuttons) corresponding to the selected key level forwarded from the PC to the flag assignment 4 matches a pushbutton signal actually applied to a certain SPS input 9. As a result of this combination, the variability of the meaning of the keys on the one hand is assured, while simultaneously, signal losses of the pushbuttons T1 through Tn, which would be objectionable for safety reasons, are precluded. The flag assignment 4 can readily be implemented by software in the operating program of the SPS.

In the embodiment of the invention shown in FIG. 1, the pushbuttons T1 through Tn are connected to the ISA bus 14 of the PC and are connected parallel to the n SPS inputs 9. With this circuit arrangement, it is assured that an actuation of the pushbuttons T1 through Tn trips an edge signal in the first PC control unit for function assignment 3 and in the control unit for flag assignment 4 of the SPS.

In the internal organization of the intrinsically conventional operating means in the PC, within the scope of the embodiment of the SPS of the invention shown in FIG. 1, a central memory unit 1 is provided, in which, for each selectable key level, a data matrix to be described in further detail hereinafter is stored in memory, in which matrix, each of the n pushbuttons is assigned one data line that contains information that is allocated in columns to different purposes.

In detail, in FIG. 1, by way of user inputs, optionally dependent on the status of the machine 11, a user control region with an associated key level is selected. This key level is an input parameter for the central control element for level control 2. The level control 2 acts as a data shunt between the central memory unit 1 and the data-processing control units for function assignment 3, flag assignment 4 and key display 6:

The control unit for key display 6 receives the labeling information. It is responsible for the screen outputs. The control unit for function assignment 3 receives the information on PC function identification. It links the pushbutton signal with the PC function identification to make a starting signal for the corresponding surface function 5. The control unit for flag assignment 4 receives the information on SPS function flags and SPS feedback flags via the data interface 8. It links the pushbutton signal with the SPS function flag, which is then processed via the SPS user logic 7 into an output signal to the machine 11. As a second function, the flag assignment 4 sends the state of the SPS feedback flag to the PC control unit for key display 6 via the data interface 8.

For further explanation of the mode of operation of the embodiment shown in FIG. 1, the signal paths for tripping a surface function or machine function will be described below.

Signal path on tripping a surface function:

Actuate pushbuttons T1 through Tn->trip edge signal in control unit for function assignment 3 via the ISA bus 14->linkage with PC function ID->start of the surface function 5->send signal "function ON" to key display 6->display of "function ON" on the screen 12.

Release pushbuttons T1 through Tn->surface function 5 remains active, until terminated by user or by some other function 5.

Signal path on tripping a machine function:

Actuate pushbuttons T1 through Tn->via SPS input, trip edge signal in control unit for flag assignment 4->setting of the SPS function flag->user logic 7 links the flag to other SPS information->setting of the associated SPS output 10 (start machine function) once all conditions have been met->setting of the SPS feedback flag->trip edge signal in control unit for flag assignment 4->send flag status via data interface 8 to control unit for key display 6->display of "function ON" on the screen 12.

Release pushbuttons T1 through Tn->via SPS input 9, trip edge signal in control unit for flag assignment 4->resetting of SPS function flag->user logic 7 links the flag to other SPS information->resetting of the associated SPS output 10 (stop machine function), if no self-holding->resetting of the SPS feedback flag ->trip edge signal in control unit for flag assignment 4->send flag status to key display 6 via data interface 8->display of "function OFF" on the screen.

Figure 2:
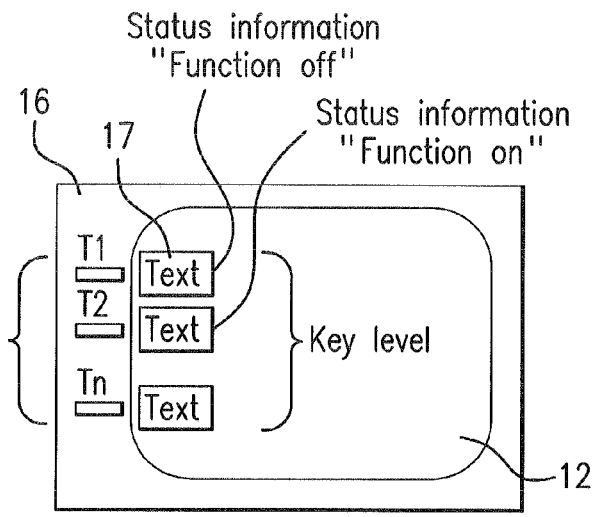
FIG. 2, a schematic illustration of essential parts of the user surface of an SPS of the invention.

In FIG. 2, as an example, a user surface of the SPS of the invention is shown, in the form of a monitor 16 with a screen 12 and additional pushbuttons T1 through Tn. The keys shown are embodied as pushbuttons. They should advantageously be located in the immediate vicinity of the screen 12 in such a way that the user can establish a direct relationship with the label and status information on the screen 12. The key label 17 is done in reserved areas of the screen 12. The status information can be displayed for instance by way of changing the color of the key label 17. A defined number of pushbuttons T1 through Tn is combined into one group of keys. The meaning of the keys always changes for the entire group of keys and can be summarized in an abstract key level.

Figure 3:
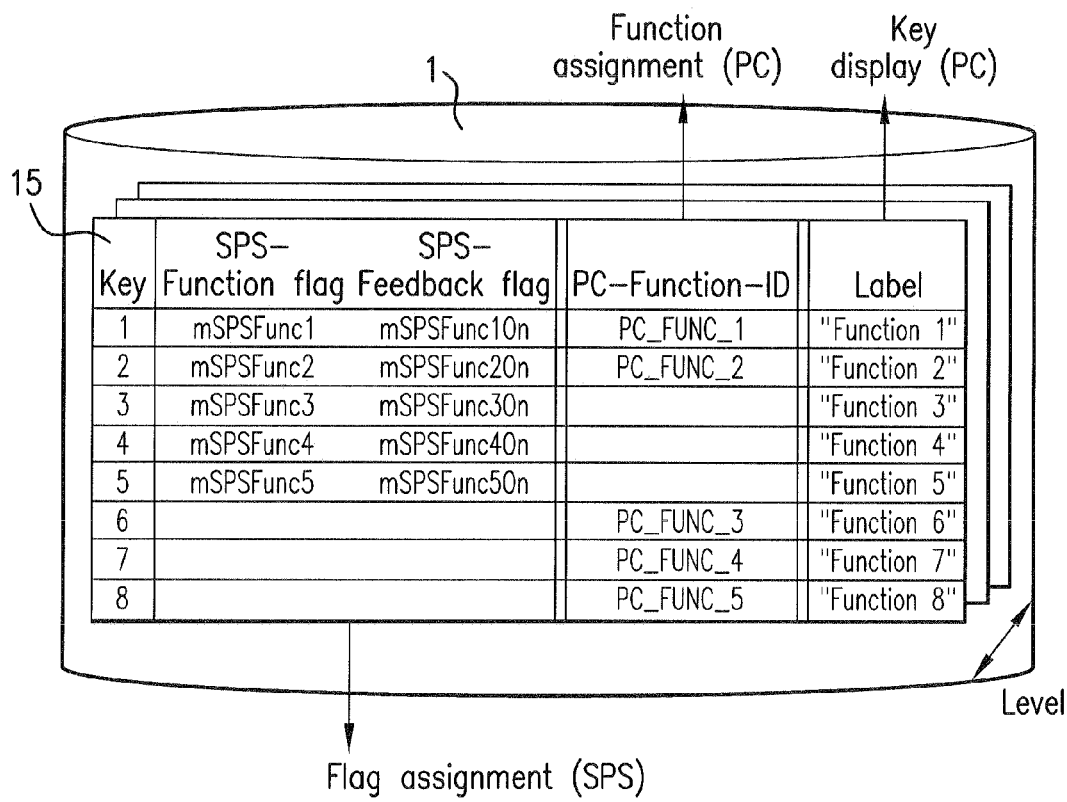
FIG. 3, a symbolic illustration of a central memory unit in the PC, with the data matrix stored there and defined for a specific selectable key level.

In a central memory unit 1 of the PC, shown symbolically in FIG. 3, the data base of the key allocation is stored in memory. From 1 to n pushbuttons are assigned the following information in a two-dimensional data matrix 15:

SPS function flag
is connected to the corresponding SPS input 9 and represents a 1:1 image of the key status. This column of the data matrix 15 is compulsory for all the embodiments with a data matrix 15.

SPS feedback flag
is set by the SPS user logic 7, when the machine function is active.

PC function ID
Function identification of the surface function 5, such as error report, which is started upon actuation of the pushbutton.

Labeling

For each key level, one data matrix 15 is stored in the central memory unit 1, as indicated in FIG. 3 for three key levels, as an example.

The various items of information in the data matrix 15 are carried onward, as indicated by the arrows in FIG. 3, to various data-processing control units 3, 4 and 6 (which for instance are the same for information that is intended to belong together).

LIST OF REFERENCE NUMERALS

1 PC memory unit
2 PC control element for level control
3 PC control unit for function assignment
4 PC control unit for flag assignment
5 PC surface functions
6 PC control unit key display
7 SPS application logic
8 Data interface
9 SPS input
10 SPS output
11 Machine
12 PC screen
13 PC keyboard
14 PC bus
15 Data matrix in 1
16 PC monitor
17 Key label on PC screen 12
T1-Tn Pushbuttons

The invention claimed is:

1. A memory-programmable control (SPS) for coupling to a data interface (8) of a personal computer (PC), the personal computer (PC) including a user interface (13), a memory and a control unit for function assignment (3), the SPS comprising:

means for operating the inputs and outputs (9, 10) of the SPS, the means including keys (T1 through Tn) for tripping machine functions, wherein the keys (T1 through Tn) are embodied as pushbuttons (T1 through Tn), provided in addition to the user interface (13) of the PC, are each electrically connected directly to one each of the SPS inputs (9) at the same time that the personal computer (PC) is coupled to the SPS and are each electrically connected, parallel to the SPS inputs (9), to an internal bus (14) of the PC;

wherein one of a plurality of key levels, each with selected meanings, stored in memory in the PC, for the pushbuttons (T1 through Tn) is selectable from the user interface (13) of the PC; and a control unit for flag assignment (4) connected directly to the SPS inputs (9) and thus to the external pushbuttons (T1 through Tn) and to the PC via the data interface (8);

wherein the control unit for flag assignment (4) receives information about a key allocation of the pushbuttons (T1 through Tn) in a particular key level upon selection and links this information with a pushbutton signal applied to an SPS input (9), and wherein upon selection of any of the keys (T1 through Tn), a respective surface function (5) of the PC, stored in the memory and simultaneously assigned to both the machine function and to the key's respective key allocation is tripped.

2. The device as defined by claim 1, wherein the control unit for function assignment (3) is connected to the pushbuttons (T1 through Tn) via the internal bus (14) in the PC, which control unit for function assignment (3) receives the information about the surface functions (5) assigned to the pushbuttons (T1 through Tn) and links the information with a pushbutton signal, applied to the internal bus (14), to make a starting signal for the surface functions (5) assigned to that pushbutton (T1 through Tn).

3. The device as defined by claim 1,
wherein a data-processing control unit (6) is provided in the PC, which data-processing control unit (6) is connected to a screen (12) of the PC and receives the information about a key label (17), corresponding to the key allocation, so that the key allocation of the particular key level selected can be displayed on the screen (12) of the PC by means of a key label (17).

4. The device as defined by claim 3,
wherein the data-processing control unit (6) receives status information about the pushbuttons (T1 through Tn) from the control unit for flag assignment (4) via the data interface (8); and
wherein the visual display of the key label (17) of the individual pushbuttons (T1 through Tn) is dependent on the status information about the individual pushbuttons (T1 through Tn).

5. The device as defined by claim 3,
wherein the pushbuttons (T1 through Tn) are located in the vicinity of the screen (12) of the PC in such a way that a direct relationship with the key label (17) and/or pushbutton status information on the screen (12) can be established by the user of the device.

6. The device as defined by claim 3,
wherein the software in the PC is embodied such that the key label (17) can be displayed in reserved areas of the screen (12) that are not coverable by other display functions.

7. The device as defined by claim 1,
wherein a central memory unit (1) is provided in the PC, in which for each selectable key level, one data matrix (15) is stored, and wherein each of the pushbuttons (T1 through Tn) is assigned a data line containing information that is allocated in columns to different purposes, which is stored with said data matrix (15).

8. The device as defined by claim 7,
wherein a central control element for level control (2) is provided in the PC, which acts as a data shunt between the central memory unit (1), the control unit for function assignment (3), the data-processing control unit (6), and the control unit for flag assignment (4).

9. The device as defined by claim 8,
wherein the data matrix (15), for each pushbutton (T1 through Tn), further stores one SPS function flag, corresponding to the allocation of the pushbutton (T1 through Tn) in the selected key level, one SPS feedback flag, one piece of label information, and one PC function identification, assigned to the allocation of the pushbutton (T1 through Tn), of the surface function (5); and
wherein the control unit for function assignment (3) receives the information on PC function identification, the data-processing control unit (6) receives the information on labeling, and the control unit for flag assignment (4) receives the information on SPS function flags and SPS feedback flags via the control element level control (2) from the central memory unit (1).

\* \* \* \* \*